3,705,875
THERMALLY STABLE POLYIMIDES
Charles E. Browning, New Carlisle, Ohio, assignor to the United States of America as represented by the Secretary of the Air Force
No Drawing. Filed Aug. 11, 1971, Ser. No. 170,966
Int. Cl. C08g 20/32
U.S. Cl. 260—63 N    6 Claims

ABSTRACT OF THE DISCLOSURE

Aromatic heterocyclic polyimides, thermally stable at high temperatures, are produced by the condensation of 2,6-diaminoanthraquinone and an aromatic tetracarboxylic dianhydride such as 1,4,5,8-naphthalenetetracarboxylic dianhydride. Because of the high thermal stability of the polyimides, they are eminently suitable for use in various aerospace applications where high temperatures are encountered. In particular, the polymers are useful for producing films, fibers, laminates, molded articles and ablative materials.

FIELD OF THE INVENTION

This invention is related to polyimides having improved thermal and oxidative stabilities. In one aspect the invention relates to a method for synthesizing the polyimides.

BACKGROUND OF THE INVENTION

Polyimides are generally recognized as belonging to a class of polymers that are resistant to thermal degradation in both inert and oxidative environments. In the early work a synthetic approach known as the polyamide-salt technique was utilized in preparing polyimides. According to this method pyromellitic dianhydride was reacted with ethanol to form the diester diacid which was treated with an aliphatic diamine to yield a diester-diacid salt. This salt was then heated to form a polymerizing melt which, after dehydration and dealcoholation, formed the polyimide. When it was attempted to synthesize wholly aromatic polyimides by the same technique, the results obtained were unsatisfactory because of the precipitation of low molecular weight powders during early stages of the reaction. This was due primarily to the fact that aromatic amines are generally not basic enough to form well defined salts. As a remedy to this situation, solution polymerization techniques were subsequently developed. According to this technique, pyromellitic dianhydride and an aromatic diamine are reacted in a suitable solvent at a moderate temperature, e.g., from ambient to 75° C., to obtain a soluble, high molecular weight polyamic acid. The polyamic acid is then dehydrated to yield a high molecular weight polyimide.

It is an object of this invention to provide novel aromatic heterocyclic polyimides that have a high thermal stability.

Another object of the invention is to provide aromatic polyimides that are particularly suitable for use in high temperature applications.

A further object of the invention is to provide a process for synthesizing the aromatic polyimides.

Other and further objects and advantages of the invention will become apparent to those skilled in the art upon consideration of the accompanying disclosure.

SUMMARY OF THE INVENTION

In one embodiment, the present invention resides in a polyimide having the following structural formula:

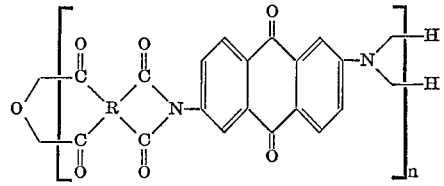

wherein R is a tetravalent aromatic radical selected from the group of radicals having the following formulas:

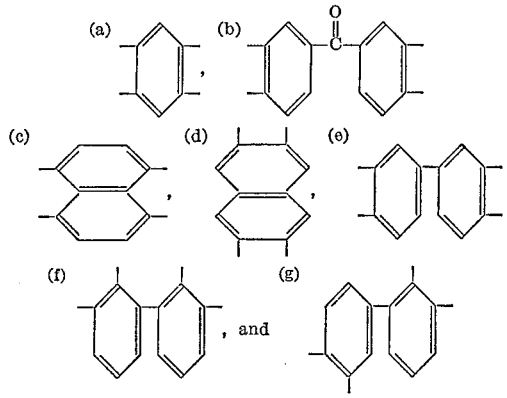

and $n$ is an integer equal to at least 2, preferably an integer in the range of about 8 to 100, inclusive. Generally when the polyimide is in the form of a powder, $n$ has a value of 8 to 10. In the case of the polyimide films, $n$ is usually greater than 10, e.g., in the range of about 10 to 100, inclusive. Alternatively, $n$ can be defined as an integer sufficient to provide a film-forming polymer. Furthermore, $n$ is an integer sufficient to provide an inherent viscosity of at least 0.075, e.g., from about 0.075 to 5 when measured at 25° C. as a 0.5 weight percent solution in concentrated sulfuric acid.

In another embodiment the present invention is concerned with a process for preparing aromatic heterocyclic polyimides. Broadly speaking, the process comprising the step of reacting 2,6-diaminoanthraquinone (DAA) with a dianhydride selected from the group consisting of pyromellitic dianhydride;
1,4,5,8-naphthalenetetracarboxylic dianhydride;
2,3,6,7-naphthalenetetracarboxylic dianhydride;
3,3',4,4'-benzophenonetetracarboxylic dianhydride;
3,3',4,4'-diphenyltetracarboxylic dianhydride;
2,2',3,3'-diphenyltetracarboxylic dianhydride; and
2,3',3,4'-diphenyltetracarboxylic dianhydride, the reaction being conducted in the presence of an organic solvent at a temperature ranging from about ambient temperature to 250° C.

The process is preferably carried out under anhydrous conditions utilizing as the reaction medium an organic compound that is a solvent for at least one of the reactants. Examples of suitable solvents include N-methylpyrrolidone, N,N-dimethylformamide, N,N-dimethylacetamide, hexamethylphosphoramide, pyridine, dimethylsulfoxide, and the like.

The temperature at which the condensation reaction is carried out is depenednt upon the type of product that is desired. When preparing polyimides in the form of a powder, the temperature generally ranges from about 100 to 250° C. The reaction period will depend upon the specific temperature utilized, being longer for lower temperatures and shorter for higher temperatures. Generally, the reaction time falls in the range of 2 to 24 hours although shorter and longer periods can be employed. In a preferred procedure for carrying out the process, the reagents are reacted in a solvent at a temperature in the range of 190 to 210° C. for a period of 6 to 10 hours. The polyimide product in the form of a powder that precipitates from the reaction mixture is separated as by filtration. After heating the separated material at 140 to 180° C. under a vacuum for 4 to 8 hours to remove any traces of residual water or solvent, the material is then heated in an inert atmosphere from ambient temperature to about 400° C. The polyimide powder is held at this elevated temperature for a period of 0.5 to 1.5 hours to insure complete cyclization. The reaction involved when preparing the polyimide in powder form can be represented by the following equation:

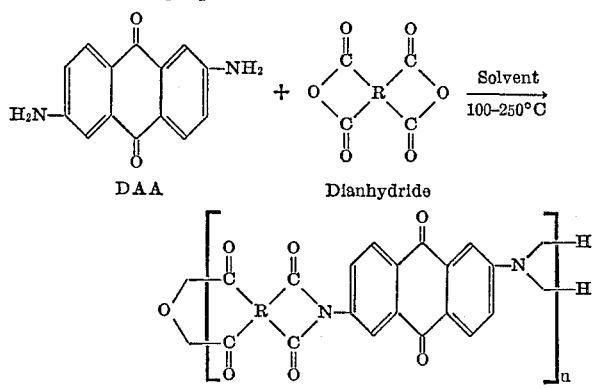

where R and n are as indicated above.

When preparing a polyimide film or other shaped article, the condensation reaction is initially conducted at a comparatively low temperature, e.g., from ambient temperature to about 80° C. The reaction is carried out at this temperature for a period of time sufficient to form a polyamic acid, the polyimide precursor. This period usually ranges from about 5 to 12 hours depending upon the recation temperature. Thereafter, the polyamic acid, cast or extruded into a desired shape, such as a film or filament, preferably while still in the solvent, is heated to an elevated temperature, e.g., from about 150 to 400° C. and higher, to convert the polyamic acid to the corresponding polyimide. The reactions involved in preparing shaped articles can be represented by the following equation:

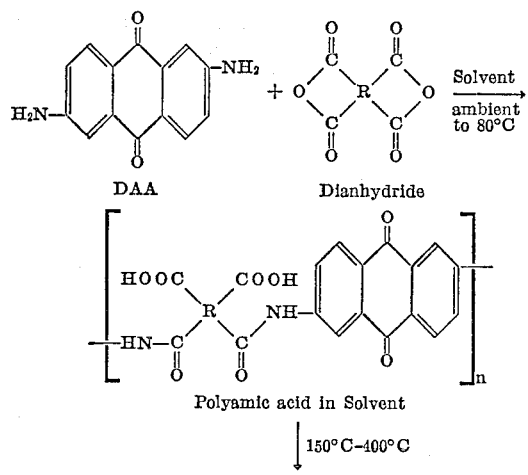

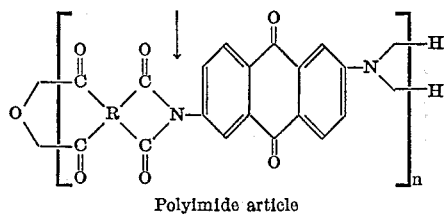

where R and n are as indicated above.

The conversion of the polyamic acid to the polyimide is preferably accomplished by heating the cast or extruded article, e.g., in a circulating air furnace or in a vacuum at a temperature and for a time sufficient to evaporate the solvent. This temperature will, of course, vary depending upon the boiling point of the particular solvent used. Thereafter, the polyamic acid is heated in an inert atmosphere or under a vacuum to an elevated temperature, e.g., up to 400° C. and higher, to convert the polyamic acid to the polyimide. It is often preferred to employ a stepwise heating procedure or cycle. Thus, in the first step, the precursor is heated under a vacuum at a temperature ranging from 150 to 200° C. for a period of about 12 to 24 hours. This initial step ensures that any residual solvent and water are removed. At the end of the initial heating period, the temperature is increased to about 275 to 325° C., and heating is conducted at this temperature in an inert atmosphere for a period of about 0.5 to 1.5 hours. Thereafter, the temperature is increased by an increment of about 25 to 75° C. and the heating is continued still in an inert atmosphere for another period of about 0.5 to 1.5 hours. One or more additional heat periods can then be carried out at an increasing temperature up to about 425° C. Any dry inert gas, such as nitrogen, helium, and argon, can be employed in the heating steps.

In conducting the process of this invention, equimolar amounts of the 2,6-diaminoanthraquinone and the dianhydride are generally used. However, it is often desirable to employ a small excess of the dianhydride, e.g., from one to 1.1 mols of the dianhydride per mol of the 2,6-diaminoanthraquinone.

A more complete understanding of the invention can be obtained by referring to the following illustrative examples which are not intended, however, to be unduly limitative of the invention.

Example I 2,6-diaminoanthraquinone (5.96 g.; 0.025 mol) was reacted with 1,4,5,8 - napthalenetetracarboxylic dianhydride (6.7 g.; 0.025 mol) in 200 cc. of N-methylpyrrolidone at 200° C. for 8 hours. The tan powder which precipitated from the reaction mixture was recovered by filtration and washed several times with hot N-methylpyrrolidone until the washings were clear. The product was then washed several times with hot acetone and dried in vacuo at 160° C. for 8 hours. The powder was thereafter heated in dry argon from room temperature to 350° C. and held at this temperature for 1 hour. The product was obtained in a yield of 81 percent. Analysis of the product gave the following results:

Calculated for $C_{28}H_{10}N_2O_6$ (percent): C, 71.49; H, 2.14; N, 5.96; O, 20.41. Found (percent): C, 71.14; H, 2.38; N, 5.98; O, 20.50.

The polyimide product had an inherent viscosity of 0.12 as determined at 25° C. on a 0.5 weight percent solution in concentrated sulfuric acid. The infrared spectrum of the product showed the characteristic imide doublet at 5.6 and 5.8 microns.

Thermogravimetric analysis (TGA) and differential thermal analysis (DTA) were performed on the polyimide product in both oxidizing and inert atmospheres. The TGA in air showed that the product exhibits no significant weight loss below 450 to 500° C. There was no significant weight loss in helium until temperatures of 550 to 600° C. were reached. The DTA obtained in air and helium were very similar with both showing small positive slopes. No large endotherms or exotherms were observed in temperatures ranging from room temperature to up to about 500° C.

The foregoing analyses show that the polyimide product had the structure represented by the following formula:

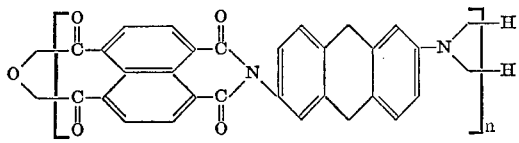

Example II 1,4,5,8-naphthalenetetracarboxylic dianhydride is added slowly while stirring to a solution of 2,6-diaminoanthraquinone in N-methylpyrrolidone at 75° C. Equimolar amounts of the reagents are used in preparing the solution, and the reagents are permitted to react at 75° C. for 8 hours. A polyamic acid film, the polyimide film precursor, is cast on mercury, and placed in a circulating air oven for a period of about 3 hours at 85° C.

The film is removed from the mercury and converted to the polyimide by heating in accordance with the following schedule:

(1) 16 hours at 160° C. in vacuo,
(2) 1 hour at 300° C. in dry helium,
(3) 1 hour at 350° C. in dry helium, and
(4) 1 hour at 400° C. in dry helium.

A polyimide film is obtained that is strong and flexible.

As seen from the foregoing data, the polyimide product of this invention is thermally stable at elevated temperatures in both inert and oxidative atmospheres. The products are useful in fabricating cast and extruded articles such as films and filaments. By using a solution of the precursor polyamic acid, polyimide composites can be readily fabricated. Furthermore, the polyimide powder can be compression molded to form articles having a desired shape.

In view of the foregoing disclosure, various modifications of the invention can be made by those skilled in the art without departing from the spirit or scope of the invention.

I claim:

1. A thermally stable polyimide consisting essentially of a polymer having a structure represented by the following formula:

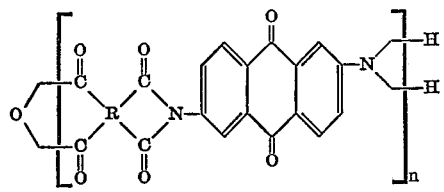

wherein R is a tetravalent aromatic radical selected from the group of radicals having the following formulas:

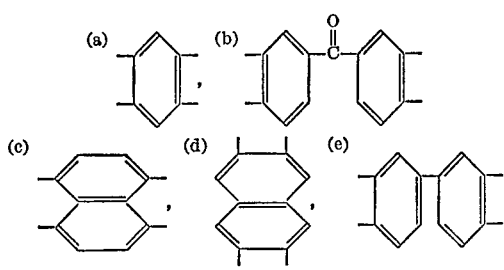

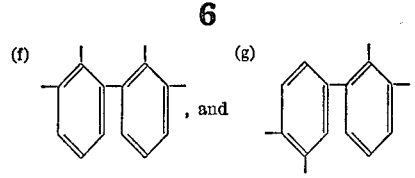

and
$n$ is an integer equal to at least 2.

2. The polyimide of claim 1 in which R is a tetravalent radical having the following formula:

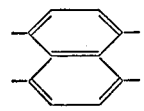

and in which $n$ is an integer in the range of about 8 to 100, inclusive.

3. The polyimide of claim 1 in which R is a tetravalent radical having the following formula:

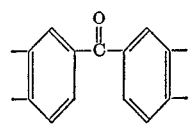

and in which $n$ is an integer in the range of about 8 to 100, inclusive.

4. The polyimide of claim 1 in which R is a tetravalent radical having the following formula:

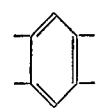

and in which $n$ is an integer in the range of about 8 to 100, inclusive.

5. The polyimide of claim 1 in which R is a tetravalent radical having the following formula:

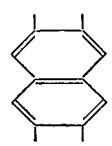

and in which $n$ is an integer in the range of about 8 to 100, inclusive.

6. The polyimide of claim 1 in which R is a tetravalent radical having the following formula:

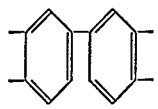

and in which $n$ is an integer in the range of about 8 to 100, inclusive.

References Cited
UNITED STATES PATENTS

| | | | |
|---|---|---|---|
| 3,179,630 | 4/1965 | Endrey | 260—78 |
| 3,422,061 | 1/1969 | Gall | 260—47 |
| 3,179,631 | 4/1965 | Endrey | 260—78 |

WILLIAM H. SHORT, Primary Examiner

L. L. LEE, Assistant Examiner

U.S. Cl. X.R.

260—30.2, 30.6 R, 30.8 DS, 32.4, 32.6 N, 65, 78 TF